(12) United States Patent
Kim et al.

(10) Patent No.: US 8,754,568 B2
(45) Date of Patent: Jun. 17, 2014

(54) SWITCHED RELUCTANCE MOTOR

(75) Inventors: Changsung Sean Kim, Gyunggi-do (KR); Guen Hong Lee, Seoul (KR); Chang Hwan Choi, Gyunggi-do (KR); Han Kyung Bae, Gyunggi-do (KR); Hong Chul Shin, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 322 days.

(21) Appl. No.: 13/306,048

(22) Filed: Nov. 29, 2011

(65) Prior Publication Data

US 2013/0057091 A1    Mar. 7, 2013

(30) Foreign Application Priority Data

Sep. 1, 2011    (KR) ........................ 10-2011-0088494

(51) Int. Cl.
| | |
|---|---|
| H02K 16/02 | (2006.01) |
| H02K 21/12 | (2006.01) |
| H02K 21/44 | (2006.01) |
| H02K 21/22 | (2006.01) |
| H02K 1/14 | (2006.01) |
| H02K 1/24 | (2006.01) |
| H02K 3/24 | (2006.01) |

(52) U.S. Cl.
CPC .............. *H02K 21/44* (2013.01); *H02K 21/222* (2013.01); *H02K 16/02* (2013.01); *H02K 1/146* (2013.01); *H02K 1/246* (2013.01); *H02K 3/24* (2013.01)
USPC .......................... 310/266; 310/114; 310/254.1

(58) Field of Classification Search
None
See application file for complete search history.

(56) References Cited

U.S. PATENT DOCUMENTS

| | | | | |
|---|---|---|---|---|
| 2,903,641 | A  * | 9/1959 | Roe .................................. | 322/39 |
| 3,683,248 | A  * | 8/1972 | Kazutsugu Kobayashi et al. .............................. | 369/267 |
| 6,998,757 | B2 * | 2/2006 | Seguchi et al. ................ | 310/266 |
| 7,119,468 | B2 * | 10/2006 | Shkondin ....................... | 310/114 |
| 7,154,192 | B2 * | 12/2006 | Jansen et al. .................... | 290/55 |
| 7,164,219 | B2 * | 1/2007 | Hoeijmakers ................. | 310/266 |
| 7,400,077 | B2 * | 7/2008 | Caroon .......................... | 310/266 |
| 7,626,299 | B2 * | 12/2009 | Yoshikawa et al. ............ | 310/114 |
| 7,750,521 | B2 * | 7/2010 | Qu et al. ........................ | 310/112 |
| 8,134,266 | B2 * | 3/2012 | Li et al. ..................... | 310/156.36 |

FOREIGN PATENT DOCUMENTS

| | | | | |
|---|---|---|---|---|
| EP | 2072320 A1 * | 6/2009 | ............ | H02K 51/00 |
| JP | 7-163105 | 6/1995 | | |
| JP | 2001-095211 | 4/2001 | | |
| JP | 2002-27785 | 1/2002 | | |
| JP | 2002-199679 | 7/2002 | | |
| JP | 2004-527994 | 9/2004 | | |
| JP | 2010-035335 | 2/2010 | | |

OTHER PUBLICATIONS

Office action dated Jul. 9, 2013 from corresponding Japan Patent Application No. 2011-267578 and its English summary provided by the clients.

* cited by examiner

*Primary Examiner* — Tran Nguyen
(74) *Attorney, Agent, or Firm* — Ladas & Parry, LLP

(57) ABSTRACT

Disclosed herein is a switched reluctance motor having a double rotor structure. An outer stator salient pole corresponding to an outer rotor salient pole is formed to have an "E" shape by sequentially disposing a main salient pole, a first auxiliary salient pole, and a second auxiliary salient pole and an inner stator salient pole corresponding to an inner rotor salient pole is formed to have a pi ($\pi$) shape by sequentially disposing a first salient pole and a second salient pole, such that a magnetic flux path is reduced, thereby making it possible to prevent the loss of magnetic force.

16 Claims, 12 Drawing Sheets

SWITCHED RELUCTANCE MOTOR

CROSS REFERENCE TO RELATED APPLICATION

This application claims the benefit of Korean Patent Application No. 10-2011-0088494, filed on Sep. 1, 2011, entitled "Switched Reluctance Motor", which is hereby incorporated by reference in its entirety into this application.

BACKGROUND OF THE INVENTION

1. Technical Field

The present invention relates to a switched reluctance motor.

2. Description of the Related Art

Recently, a demand for a motor has largely increased in various industries such as vehicles, aerospace, military, medical equipment, or the like. In particular, a cost of a motor using a permanent magnet is increased due to the sudden price increase of a rare earth material, such that a switched reluctance (SR) motor has become interested as a new alternative.

A driving principle of an SR motor rotates a rotor using a reluctance torque generated according to a change in magnetic reluctance.

As shown in FIG. 1, a switched reluctance motor 100 according to the prior art includes a rotor 110 and a stator 120, wherein the rotor 110 is provided with a plurality of rotor salient poles 111 and the stator 120 is provided with a plurality of stator salient poles 121 facing the rotor salient poles 111. Further, a coil 130 is wound around the stator salient poles 121.

Further, the rotor 110 is configured of only an iron core without any type of excitation device, for example, a winding of a coil or a permanent magnet.

Therefore, when current flows in the coil 130 from the outside, a reluctance torque moving the rotor 110 toward the coil 130 by magnetic force generated from the coil 130 is generated, such that the rotor 110 rotates in a direction in which resistance of a magnetic circuit is minimized.

However, the switched reluctance motor 100 according to the prior art may lead to core loss since a magnetic flux path passes through both of the stator 120 and the rotor 110.

SUMMARY OF THE INVENTION

The present invention has been made in an effort to provide a switched reluctance motor having a double rotor structure capable of reducing core loss by reducing a magnetic flux path through a structural change of a stator core corresponding to an inner rotor and an outer rotor and doubling operating efficiency by inserting a magnet.

According to a preferred embodiment of the present invention, there is provided a switched reluctance motor including: an outer rotor including a plurality of outer rotor salient poles formed at equidistance along a circular inner circumferential surface thereof; an inner rotor received in an inner portion of the outer rotor and including a plurality of inner rotor salient poles formed at equidistance along a circular outer circumferential surface thereof; and a stator core formed between the outer rotor and the inner rotor and including a plurality of outer stator salient poles each including a main salient pole, a first auxiliary salient pole, and a second auxiliary salient pole that correspond to the outer rotor salient poles and are sequentially formed along an outer circumferential surface thereof and a plurality of inner stator salient poles each including a first salient pole and a second salient pole that correspond to the inner rotor salient poles and are sequentially formed along an inner circumferential surface thereof, wherein each of coils is wound around the main salient pole and the first and second salient poles.

The first and second auxiliary salient poles of the outer stator salient pole and the first and second salient poles of the inner stator salient pole may be disposed to correspond to each other in a direction in which they face each other.

The switched reluctance motor may further include support materials formed between the first and second salient poles configuring the inner stator salient pole and between the plurality of inner stator salient poles.

The support material may be a non-magnetic material or an insulation material.

The switched reluctance motor may further include cooling pipes inserted into the support material and disposed between the plurality of inner stator salient poles.

The switched reluctance motor may further include sound proofing materials formed between the plurality of outer rotor salient poles formed at equidistance.

The main salient pole configuring the outer stator salient pole may have a width wider than those of the first and second auxiliary salient poles in a circumferential direction.

The switched reluctance motor may further include magnets inserted into an annular stator core connecting the first and second salient poles configuring the inner stator salient pole to each other.

According to another preferred embodiment of the present invention, there is provided a switched reluctance motor including: an outer rotor including a plurality of outer rotor salient poles formed at equidistance along a circular inner circumferential surface thereof; an inner rotor received in an inner portion of the outer rotor and including a plurality of inner rotor salient poles formed at equidistance along a circular outer circumferential surface thereof; and a stator core formed between the outer rotor and the inner rotor and including a plurality of outer stator salient poles each including a main salient pole, a first auxiliary salient pole, and a second auxiliary salient pole that correspond to the outer rotor salient poles and are sequentially formed along an outer circumferential surface thereof and a plurality of inner stator salient poles each including a first salient pole and a second salient pole that correspond to the inner rotor salient poles and are sequentially formed along an inner circumferential surface thereof, wherein each of coils is wound around the first and second auxiliary salient poles and the first and second salient poles.

The first and second auxiliary salient poles of the outer stator salient pole and the first and second salient poles of the inner stator salient pole may be disposed to correspond to each other in a direction in which they face each other.

The switched reluctance motor may further include support materials formed between the first and second salient poles configuring the inner stator salient pole and between the plurality of inner stator salient poles.

The support material may be a non-magnetic material or an insulation material.

The switched reluctance motor may further include cooling pipes inserted into the support material and disposed between the plurality of inner stator salient poles.

The switched reluctance motor may further include sound proofing materials formed between the plurality of outer rotor salient poles formed at equidistance.

The main salient pole configuring the outer stator salient pole may have a width wider than those of the first and second auxiliary salient poles in a circumferential direction.

The switched reluctance motor may further include magnets inserted into an annular stator core connecting the first and second salient poles configuring the inner stator salient pole to each other.

DESCRIPTION OF THE PREFERRED EMBODIMENTS

Figure 1:
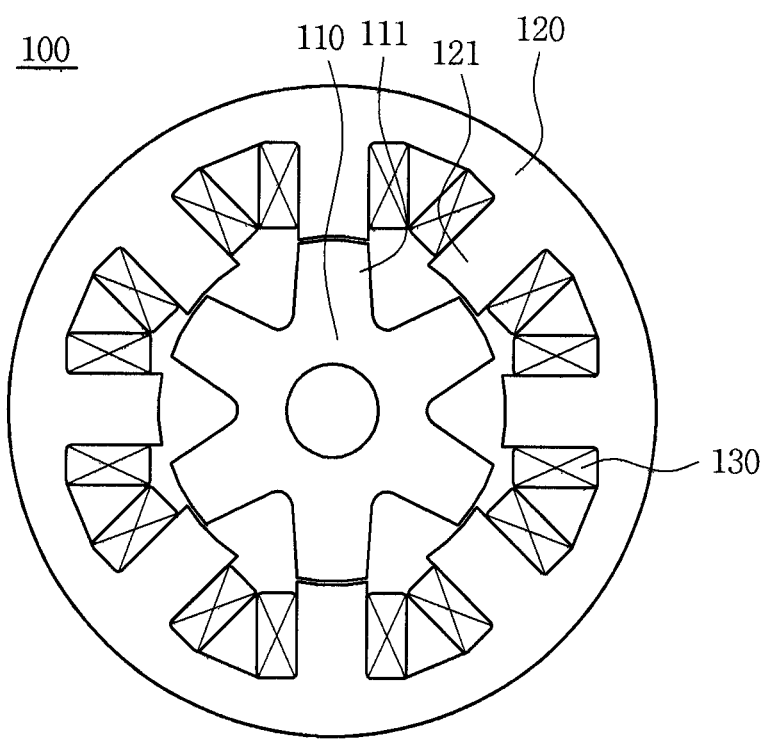
FIG. 1 is a schematic cross-sectional view of a switched reluctance motor according to the prior art.

Various features and advantages of the present invention will be more obvious from the following description with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. In addition, the terms "first", "second", "one surface", "the other surface" and so on are used to distinguish one element from another element, and the elements are not defined by the above terms. In describing the present invention, a detailed description of related known functions or configurations will be omitted so as not to obscure the gist of the present invention.

Hereinafter, preferred embodiments of the present invention will be described in detail with reference to the accompanying drawings.

Figure 2A:
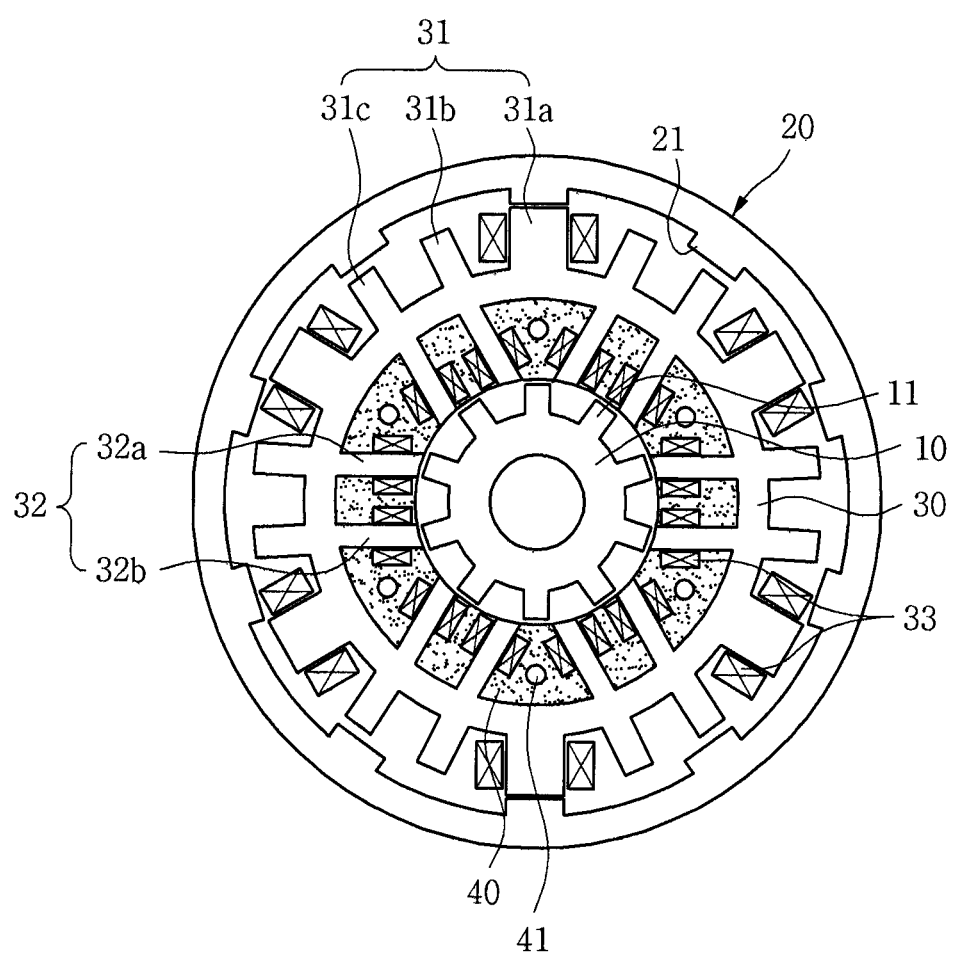
FIGS. 2A and 2B are cross-sectional views of a switched reluctance motor according to a preferred embodiment of the present invention.
Figure 2B:
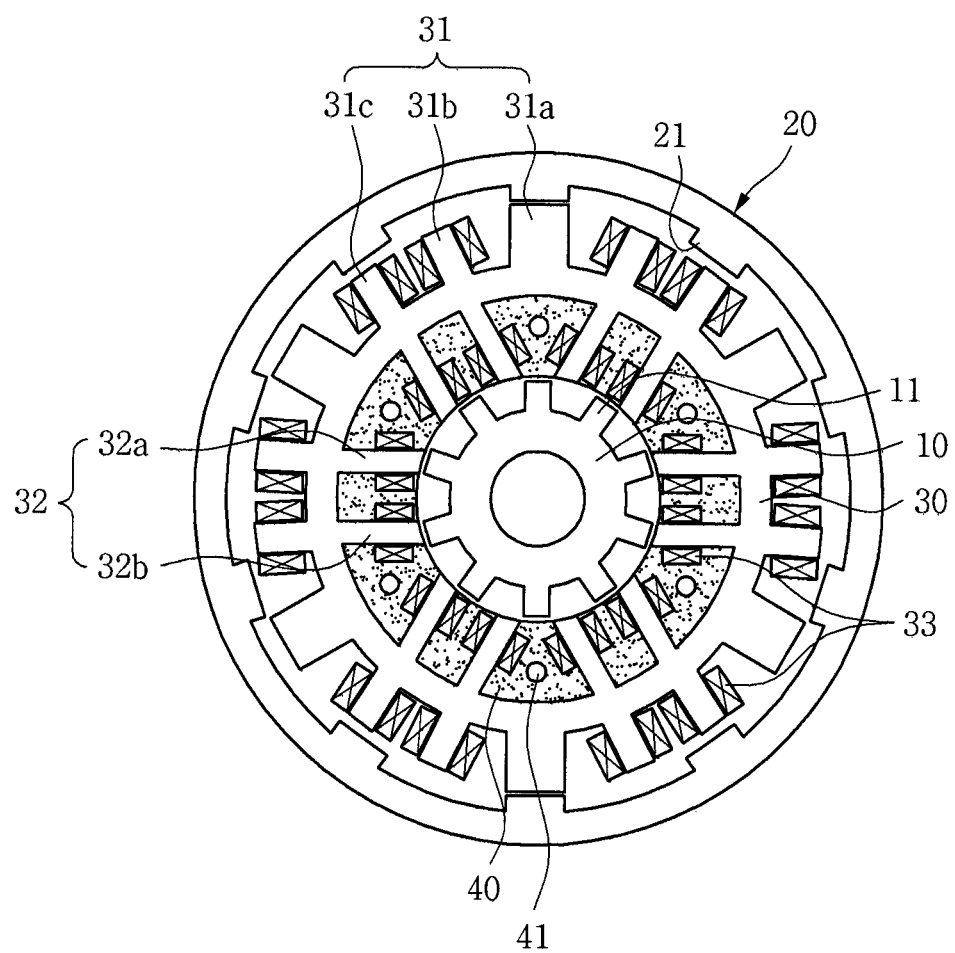
Figure 3:
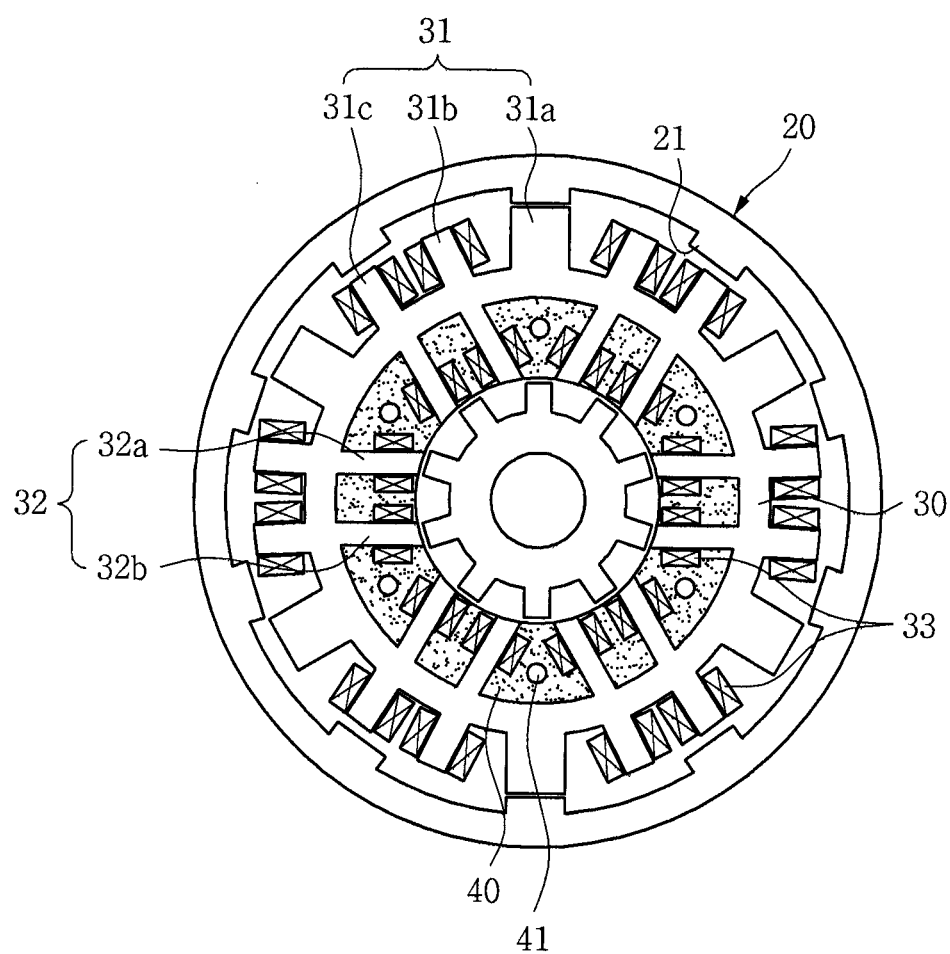
FIG. 3 is a cross-sectional view of a switched reluctance motor in which a position of a winding of a coil is changed according to another preferred embodiment of the present invention.
Figure 4:
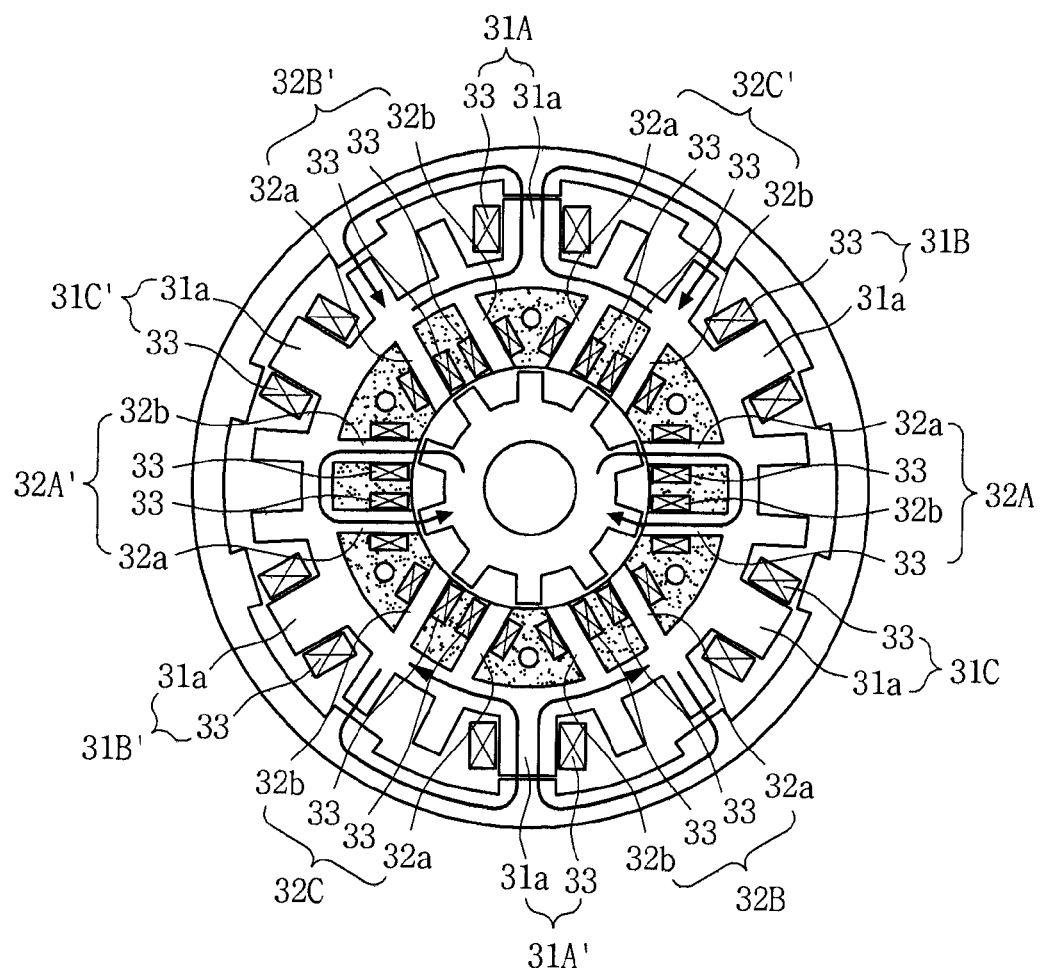
FIG. 4 is a cross-sectional view showing a magnetic flux path according to an operation of the switched reluctance motor according to the preferred embodiment of the present invention.
Figure 5:
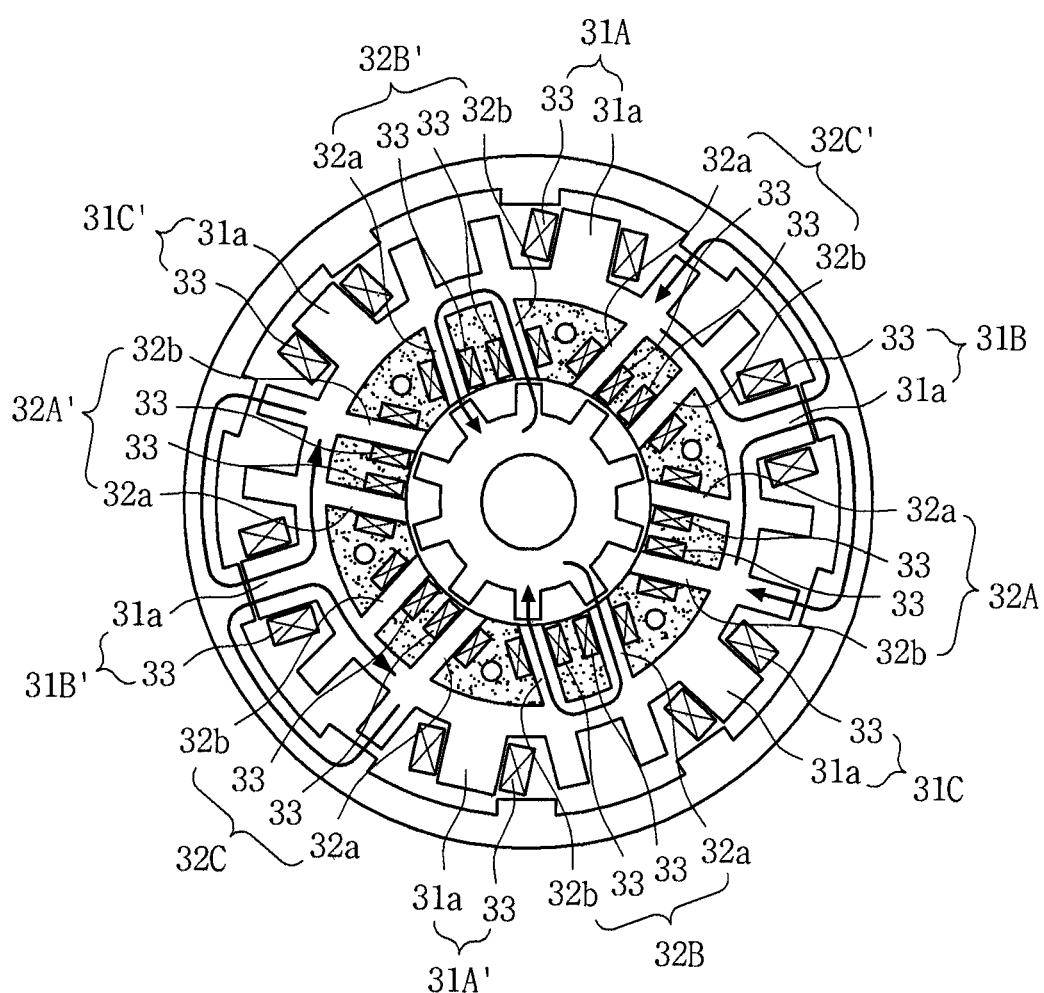
FIG. 5 is a cross-sectional view showing a magnetic flux path according to an operation of the switched reluctance motor after the operation of FIG. 4.

FIGS. 2A and 2B are cross-sectional views of a switched reluctance motor according to a preferred embodiment of the present invention; FIG. 3 is a cross-sectional view of a switched reluctance motor in which a position of a winding of a coil 33 is changed according to another preferred embodiment of the present invention; FIG. 4 is a cross-sectional view showing a magnetic flux path according to an operation of the switched reluctance motor according to the preferred embodiment of the present invention; FIG. 5 is a cross-sectional view showing a magnetic flux path according to an operation of the switched reluctance motor after the operation of FIG. 4.

The switched reluctance motor according to the preferred embodiment of the present invention includes an outer rotor 20 including a plurality of outer rotor salient poles 21 formed at equidistance along a circular inner circumferential surface thereof; an inner rotor 10 received in an inner portion of the outer rotor 20 and including a plurality of inner rotor salient poles 11 formed at equidistance along a circular outer circumferential surface thereof; and a stator core 30 formed to face each of the outer rotor 20 and the inner rotor 10 between the outer rotor 20 and the inner rotor 10 and including a plurality of outer stator salient poles 31 each including a main salient pole 31a, a first auxiliary salient pole 31b, and a second auxiliary salient pole 31c that correspond to the outer rotor salient poles 21 and are sequentially formed along an outer circumferential surface thereof and a plurality of inner stator salient poles 32 each including a first salient pole 32a and a second salient pole 32b that correspond to the inner rotor salient poles 11 and are sequentially formed along an inner circumferential surface thereof, wherein each of coils 33 is wound around the main salient pole 31a and the first and second salient poles 32a and 32b.

The switched reluctance motor having a double rotor structure according to the preferred embodiment of the present invention includes the outer rotor 20, which is an outer rotor, the inner rotor 10, which is an inner rotor, and the stator core 30 formed between the outer rotor 20 and the inner rotor 10. The stator core 30 may have a shape corresponding to those of the inner rotor 10 and the outer rotor 20, and may generally have an annular shape. Each of an outer circumferential surface and an inner circumferential surface of the annular stator core 30 is provided with the plurality of outer stator salient poles 31 and inner stator salient poles 32 each corresponding to the salient poles of the outer rotor 20 and the salient poles of the inner rotor 10.

As shown in FIGS. 2A and 2B, the outer rotor 20 includes the plurality of outer rotor salient poles 21 formed at equidistance along the circular inner circumferential surface thereof. The outer rotor 20, which is an outer rotor formed at an outer side and rotating, includes the outer rotor salient poles 21 formed inwardly at equidistance so as to correspond to the outer stator salient poles 31 formed on a stator core 30 to be described below. In this configuration, the outer rotor salient poles 21 are formed to face the outer stator salient poles 31. However, current is applied to the wound coil 33 in a sequence of an A phase, a B phase, and a C phase to electrically excite an A phase winding part 31A, a B phase winding part 31B, and a C phase winding part 31C, such that the outer rotor 20 rotates.

The inner rotor 10 is received in an inner portion of the outer rotor 20 and is disposed to be rotatable. The inner rotor 10 may include the plurality of inner rotor salient poles 11 protruded along the circular outer circumferential surface thereof. The inner rotor 10, which is an inner rotor formed at an inner side, includes the inner rotor salient poles 11 formed at equidistance so as to correspond to the inner stator salient poles 32 of a stator core 30 to be described below. In this configuration, the inner rotor salient poles 11 are formed to face the inner stator salient poles 32. However, current is applied to the wound coil 33 in a sequence of an A phase, a B phase, and a C phase to electrically excite an A phase winding part 32A, a B phase winding part 32B, and a C phase winding part 32C, such that the inner rotor 10 rotates.

The stator core 30 is formed between the outer rotor 20 and the inner rotor 10. In consideration of a fact that the outer rotor 20 and the inner rotor 10 have a circular outer shape, the stator core 30 may also have an annular shape so as to correspond to the circular outer shape of the outer rotor 20 and the inner rotor 10. However, it is obvious to those skilled in the art that an appropriate design change may be made so that the stator core 30 has a shape corresponding to those of the inner rotor 10 and the outer rotor 20. The stator core 30 is provided with each of the outer stator salient poles 31 and the inner stator salient poles 32 corresponding to the outer rotor salient poles 21 and the inner rotor salient poles 11 each formed on the outer rotor 20 and the inner rotor 10.

The plurality of outer stator salient poles 31 are formed at equidistance so as to be protruded outwardly on the outer circumferential surface of the stator core 30 and are formed to correspond to the outer rotor salient poles 21 formed to be protruded from the inner circumferential surface of the outer rotor 20. The outer stator salient pole 31, which is configured of the main salient pole 31a, the first auxiliary salient pole 31b, and the second auxiliary salient pole 31c, includes the main salient pole 31a, the first auxiliary salient pole 31b, and the second auxiliary salient pole 31c that are sequentially formed in one direction (according to the preferred embodiment of the present invention, a unit of the outer stator salient pole is based on the case in which the main salient pole, the first auxiliary salient pole, and the second auxiliary salient pole are sequentially formed in a counterclockwise direction as shown in FIG. 2). The main salient pole 31a may have a width wider than those of the first and second auxiliary salient poles 31b and 31c in a circumferential direction so that a magnetic flux generated by applying the current to the wound coil 33 may be bisected and flow. For example, the main salient pole 31a may have a width two times wider than those of the first and second auxiliary salient poles 31b and 31c. The plurality of outer stator salient poles 31 formed as described above may be sequentially disposed on the stator core 30. A structure of a unit outer stator salient pole 31 has a shape of an English letter "E" as shown in FIG. 1. The coil 33 may be wound only around the main salient pole 31a or be wound only around the first and second auxiliary salient poles 31b and 31c except for the main salient pole 31a.

The plurality of inner stator salient poles 32 are formed at equidistance so as to be protruded inwardly on the inner circumferential surface of the stator core 30 and are formed to correspond to the inner rotor salient poles 11 formed to be protruded outwardly from the inner circumferential surface of the inner rotor 10. The inner stator salient pole 32, which is configured of the first and second salient poles 32a and 32b, generally forms a pi ($\pi$) shape together with the stator core 30 to which the first and second salient poles 32a and 32b are connected. The first and second salient poles 32a and 32b are formed to be spaced apart from each other in parallel with each other on the stator core 30 to reduce a magnetic flux path to be described below, thereby making it possible to reduce core loss.

As shown in FIGS. 2A and 2B, according to the preferred embodiment of the present invention, the outer stator salient pole 31 and the inner stator salient pole 32 formed on the annular stator core 30 are formed in a direction in which they face each other. Particularly, the first and second auxiliary salient poles 31b and 31c of the outer stator salient pole 31 and the first and second salient poles 32a and 32b of the inner stator salient pole 32 may be formed on the same line but be formed to correspond to each other in an opposite direction to each other. Due to this configuration, in a structure in which magnets 60 to be described are inserted, the magnets 60 may be efficiently disposed on a magnetic flux path formed by current applied in order to rotate the outer rotor 20 and a magnetic flux path formed by current applied in order to rotate the inner rotor 10. Through this disposition, the magnets 60 are formed on the magnetic flux paths, thereby making it possible to prevent loss of magnetic force and simultaneously utilize all of the magnets 60.

As shown in FIG. 2A, support materials 40 may be filled between the first and second salient poles 32a and 32b configuring the inner stator salient pole 32 and between the plurality of inner stator salient poles 32. The support material 40 may be a non-magnetic material or an insulation material and is formed between the plurality of inner stator salient poles 32, thereby making it possible to improve strength of the stator. In addition, it is possible to reduce vibration and noise generated during driving of the motor. Further, as shown in FIG. 2B, the support materials 40a may also be formed between the outer stator salient poles 31.

As shown in FIG. 2A, cooling pipes 41 may be further formed in a form in which they are inserted into the support materials 40 in order to radiate high heat generated due to high speed operation of the motor. The cooling pipes 41 may be formed between unit inner stator salient poles 32 and be implemented as a water cooling pipe in which water flows. In addition, it is obvious to those skilled in the art that a design change may be made so that various materials for cooling a high temperature are used as a material forming an inner portion of the cooling pipe 41. Further, as shown in FIG. 2B, the cooling pipe 41a may also be formed between the support materials 40a formed between the outer stator salient poles 31.

FIGS. 4 and 5 are views showing a magnetic flux flow path of the switched reluctance motor formed when current is applied to the switched reluctance motor according to the preferred embodiment of the present invention.

As shown in FIG. 4, in order to rotate the outer rotor 20, when an A phase winding part 31A, which is a first phase, including the coil 33 wound around the main salient pole 31a of the outer stator salient pole 31 of the stator core 30 has current applied thereto to be excited, thereby generating a magnetic flux, the magnetic flux is bisected in the main salient pole 31a. Then, the bisected magnetic fluxes flow in auxiliary salient poles of the outer stator salient pole 31 adjacent thereto at both sides thereof, that is, a first auxiliary salient pole 31b of a B phase winding part 31B and a second auxiliary salient pole 31c of the A phase winding part 31A, respectively, through the salient pole of the outer rotor 20. Here, a unit of the outer stator salient pole 31 is based on the case in which the main salient pole 31a of each phase winding part around which the coil of each phase is wound, the first auxiliary salient pole 31b, and the second salient pole 31c are sequentially formed in a counterclockwise direction in the cross-sectional view of FIG. 4.

Likewise, when an A' phase winding part 31A', which is a first phase, formed on the opposite side to the A phase winding part 31A and including the coil 33 wound around the main salient pole 31a of the outer stator salient pole 31 has current applied thereto to be excited, a generated magnetic flux is bisected in the main salient pole 31a of the A' phase winding part 31A. Then, the bisected magnetic fluxes flow in auxiliary salient poles of the outer stator salient pole 31 adjacent thereto at both sides thereof, that is, a first auxiliary salient pole 31b of a B' phase winding part 31B' and a second auxiliary salient pole 31c of the A' phase winding part 31A', respectively, through the outer rotor salient pole 21.

At the same time, in order to rotate the inner rotor 10, when the inner stator salient pole 32 of the stator core 30 including the coil 33 wound therearound has current applied thereto to be excited, thereby generating a magnetic flux, the magnetic flux flows from a second salient pole 32b of an A phase winding part 32A, which is an inner stator salient pole 32 including the coil 33 wound therearound, to an inner rotor salient pole 11 facing a distal end of the second salient pole 32b. Then, the magnetic flux sequentially passes through another inner rotor salient pole 11 adjacent to the inner rotor salient pole 11 and a first salient pole 32a facing another inner rotor salient pole 11 and including the coil wound therearound and then flows in an annular stator core 30 connecting the first and second salient poles 32a and 32b to each other, thereby making it possible to implement a shorter magnetic flux path of the A phase winding part 32A as compared to the case according to the prior art.

Likewise, when an A' phase winding part 32A' formed on the opposite side to the A phase winding part 32A has current applied thereto, a magnetic flux flows from a first salient pole 32a of the A' phase winding part 32A' including the coil 33 wound therearound to an inner rotor salient pole 11 facing the first salient pole 32a. Then, the magnetic flux sequentially passes through another inner rotor salient pole 11 adjacent to the inner rotor salient pole 11 and a second salient pole 32b facing another inner rotor salient pole 11 and including the coil wound therearound and then flows in the annular stator core 30 connecting the first and second salient poles 32a and 32b to each other, thereby making it possible to implement a shorter magnetic flux path of the A' phase winding part 32A' as compared to the case according to the prior art.

FIG. 5 shows a flow of a magnetic flux in the case in which a B phase winding part 31B, which is an adjacent outer stator salient pole 31, has current applied thereto to be excited, after FIG. 4. Since a technical principle thereof is the same as that of FIG. 4, a detailed description thereof will be omitted. When the current is applied through this principle, magnetic resistance is changed, such that the switched reluctance motor is driven.

Figure 6:
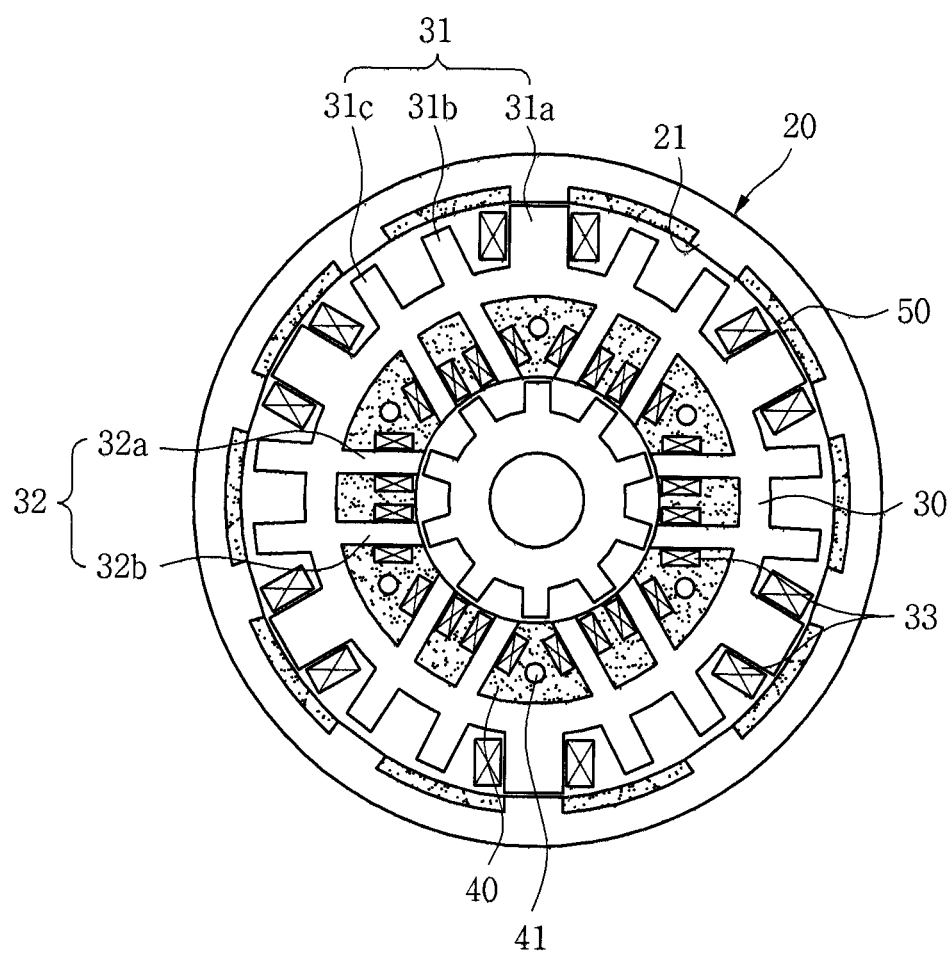
FIG. 6 is a cross-sectional view of a modified example of the switched reluctance motor of FIG. 2 including a sound proofing material.

FIG. 6 is a view showing that sound proofing materials 50 are formed between the outer rotor salient poles 21 formed at equidistance on the outer rotor 20. The sound proofing materials 50 are formed between the outer rotor salient poles 21 of the outer rotor 20, thereby making it possible to reduce vibration and noise at the time of driving of the motor. The sound proofing material 50 may be a general insulation material. However, the sound proofing material 50 is not necessarily limited thereto but may be any non-conductive material as long as it may be disposed between the outer rotor salient poles 21.

Figure 7A:
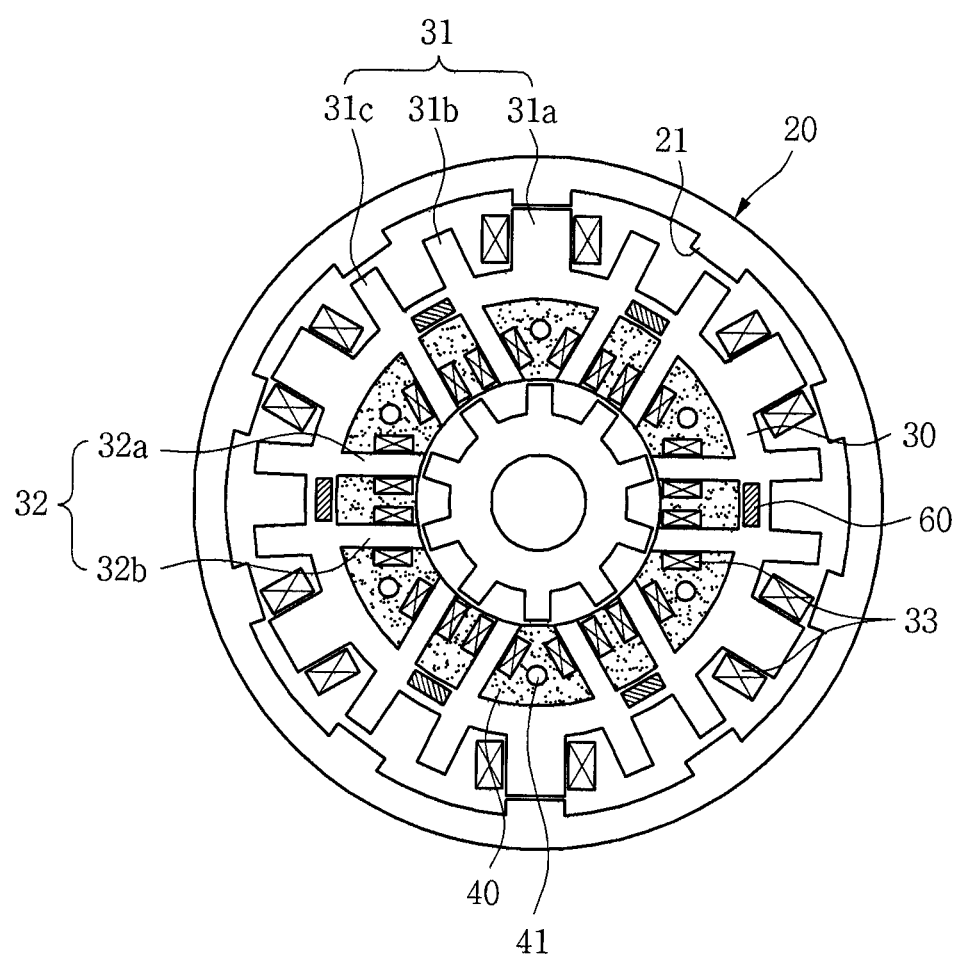
FIGS. 7A and 7B are cross-sectional views of a switched reluctance motor including a magnet according to another preferred embodiment of the present invention.
Figure 7B:
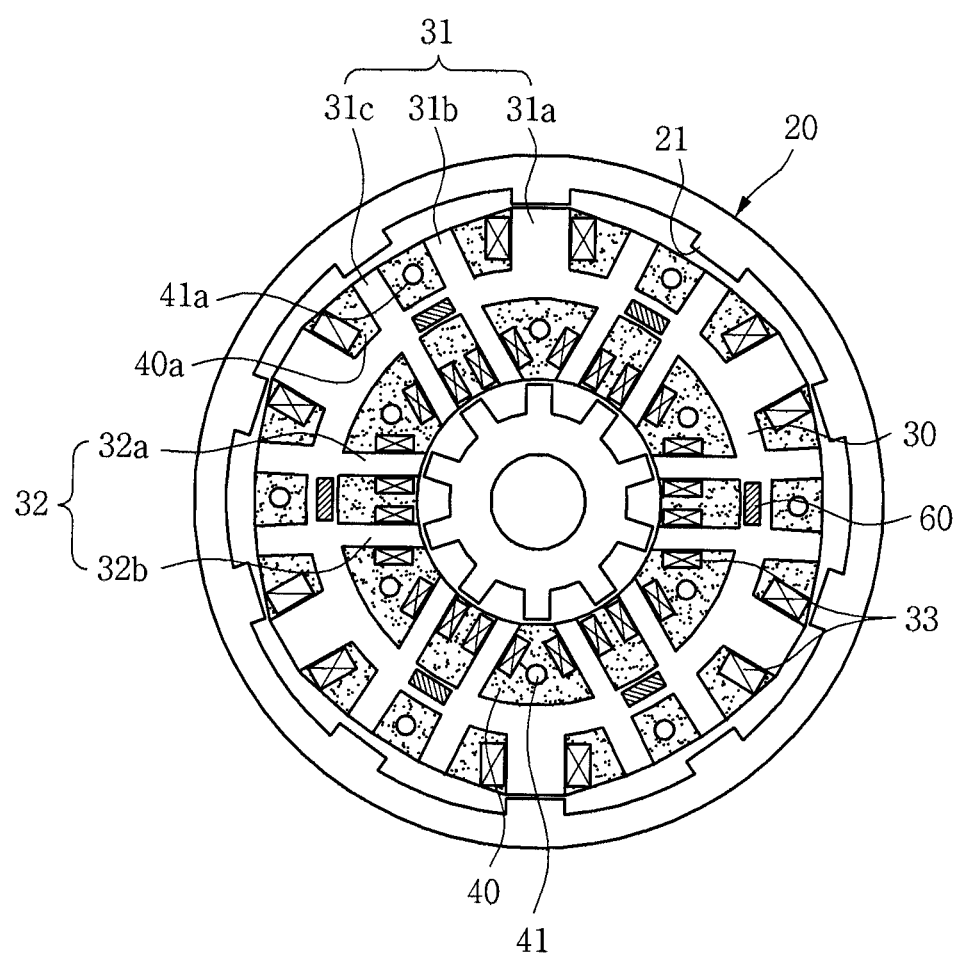

FIGS. 7A and 7B are views showing a structure in which magnets 60 are inserted into a stator core 30 of a switched reluctance motor according to another preferred embodiment of the present invention to double an effect together with applied current. As shown in FIGS. 7A and 7B and described above, the support materials 40 and 40a may be formed between the inner stator salient poles 32 of the stator core or between the outer stator salient poles 31, and each of the cooling pipes 41 and 41a may be formed in each of the support materials 40 and 40a.

The switched reluctance motor according to another preferred embodiment of the present invention includes an outer rotor 20 including a plurality of outer rotor salient poles 21 formed at equidistance along a circular inner circumferential surface thereof; an inner rotor 10 received in an inner portion of the outer rotor 20 and including a plurality of inner rotor salient poles 11 formed at equidistance along a circular outer circumferential surface thereof; and a stator core 30 formed to face each of the outer rotor 20 and the inner rotor 10 between the outer rotor 20 and the inner rotor 10 and including a plurality of outer stator salient poles 31 each including a main salient pole 31a, a first auxiliary salient pole 31b, and a second auxiliary salient pole 31c that correspond to the outer rotor salient poles 21 and are sequentially formed along an outer circumferential surface thereof and a plurality of inner stator salient poles 32 each including a first salient pole 32a and a second salient pole 32b that correspond to the inner rotor salient poles 11 and are sequentially formed along an inner circumferential surface thereof, wherein each of coils 33 is wound around the first and second auxiliary salient poles 31a and 31b and the first and second salient poles 32a and 32b.

However, a description of a configuration overlapped with that of the switched reluctance motor according to the preferred embodiment of the present invention described above will be omitted.

Here, as the magnet 60, a ferrite permanent magnet, a rare earth permanent magnet, an Alico permanent magnet may be used. Particularly, as the rare earth permanent magnet, there are SmCo and NdFeB. The SmCo has advantages in that it has a high residual magnetic flux density, a high coercive force, a high energy product, and a temperature coefficient such as a demagnetizing curve, and the NdFeB has advantages in that it has residual magnetic flux density and coercive force characteristics higher than those of the SmCo.

Figure 10:
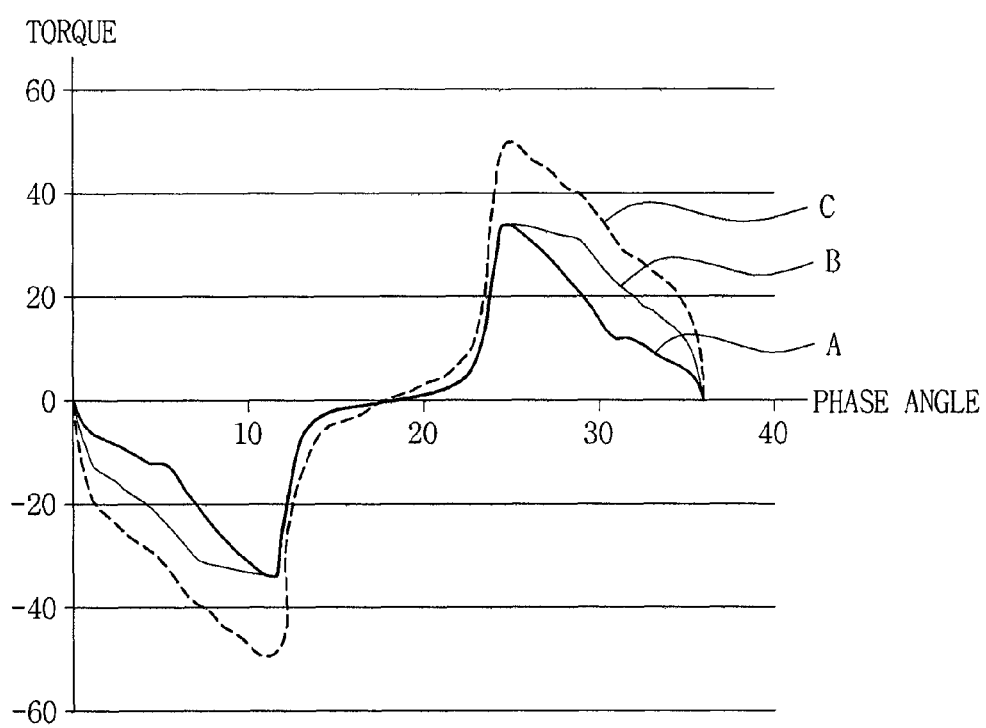
FIG. 10 is a graph showing phase differences and torque characteristics according to use of the magnet of the switched reluctance motor according to the preferred embodiment of the present invention.

Particularly, as shown in FIG. 10, it may be appreciated that torque characteristics (graphs B and C) according to a phase angle in the case in which the magnet 60 is inserted were further improved as compared to torque characteristics (a graph A) according to a phase angle in the case in which the magnet 60 is not inserted. More specifically, a positive value and a negative value of torque characteristics on a Y axis indicate torque values according to a simulation result in a forward direction and a reverse direction, which are rotation directions of each rotor. According to the kind of magnet 60, in the case of the NdFeB, which is the rare earth permanent magnet, graph C shows a torque value according to a phase angle, and in the case of the ferrite permanent magnet, graph B shows a torque value according to a phase angle. It may be appreciated from the graph of FIG. 10 that the torque characteristics according to the phase angle were further improved in graphs B and C in which the magnet 60 is inserted as compared to graph A in which the magnet 60 is not inserted.

The magnet 60 is inserted into an annular stator core 30 connected between the first and second salient poles 32a and 32b configuring the inner stator salient pole 32. The magnet 60 is formed between the first and second salient poles 32a and 32b, such that when the magnetic flux flows in the stator core 30 connected between the first and second salient poles 32a and 32b as described above, magnetic force by the magnetic flux relatively increases due to the insertion of the magnet 60. Likewise, the same magnet 60 is inserted into a path of a magnetic flux bisected and in the main salient pole 31a and flowing through the outer stator saline pole 31, thereby making it possible to obtain the same effect.

Figure 8:
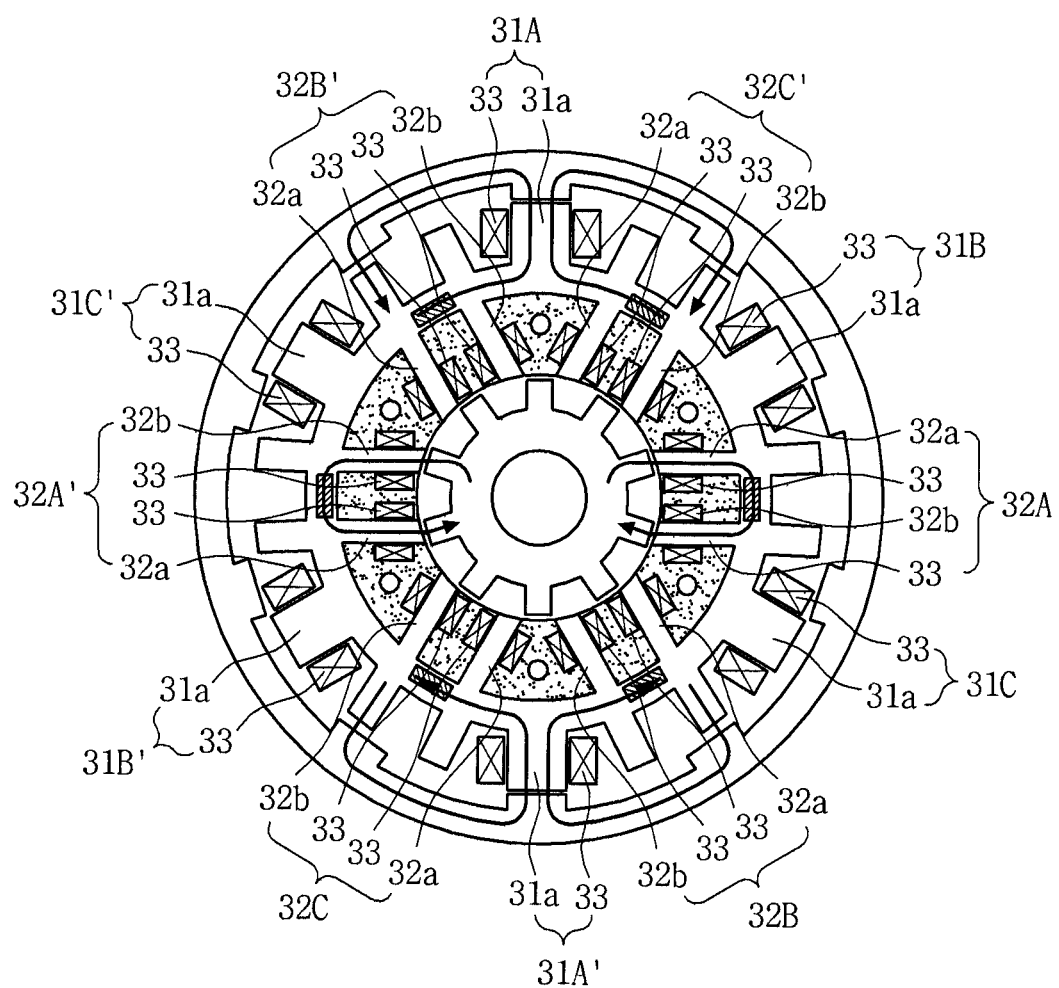
FIG. 8 is a cross-sectional view showing a magnetic flux path according to an operation of the switched reluctance motor of FIG. 7.
Figure 9:
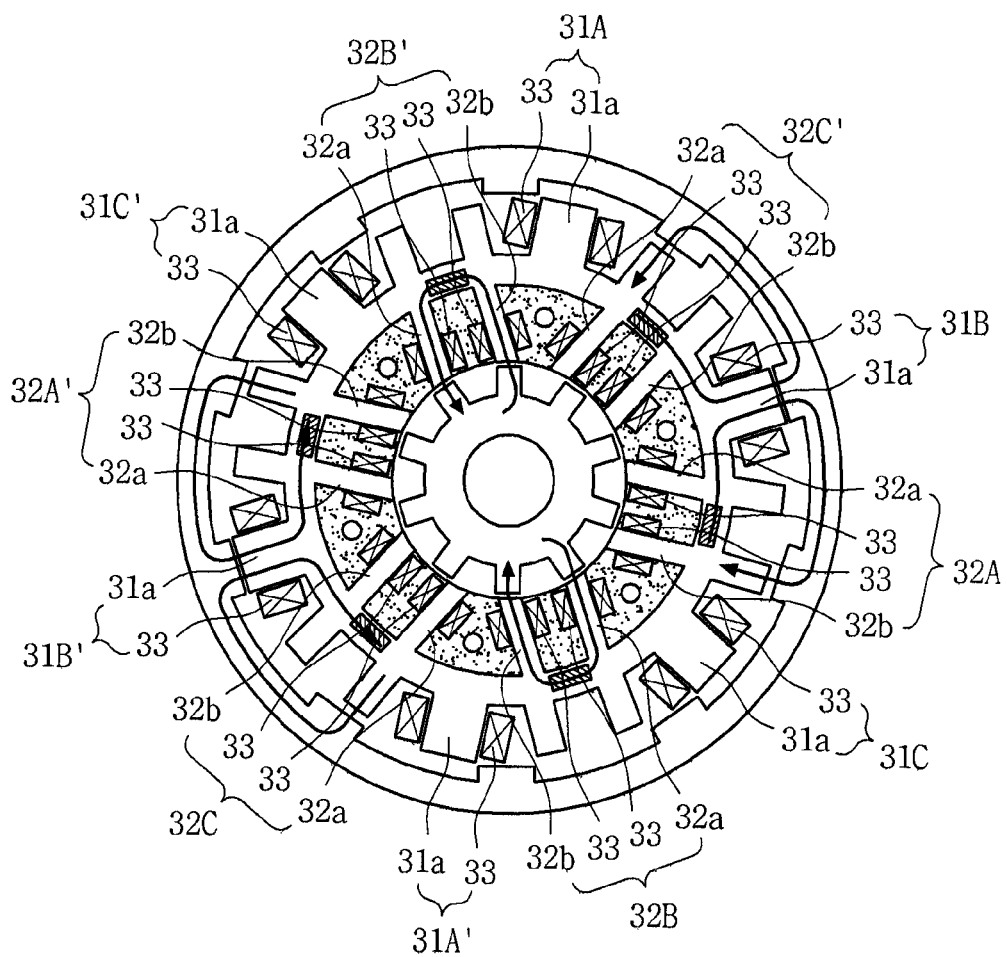
FIG. 9 is a cross-sectional view showing a magnetic flux path according to an operation of the switched reluctance motor after the operation of the switched reluctance motor of FIG. 8.

More specifically, a description will be provided with reference to a flow of a magnetic flux in the case in which the switched reluctance motor having a double rotor structure and including the magnet 60 inserted thereinto as shown in FIGS. 8 and 9 has current applied thereto to be excited.

As shown in FIG. 8, in order to rotate the outer rotor 20, when an A phase winding part 31A, which is a first phase, including the coil 33 wound around the main salient pole 31a of the outer stator salient pole 31 of the stator core 30 has current applied thereto to be excited, thereby generating a magnetic flux, the magnetic flux is bisected in the main salient pole 31a. Then, the bisected magnetic fluxes flow in auxiliary salient poles of the outer stator salient pole 31 adjacent thereto at both sides thereof, that is, a first auxiliary salient pole 31b of a B phase winding part 31B and a second auxiliary salient pole 31c of the A phase winding part 31A, respectively, through the salient pole of the outer rotor 20. Then, the magnetic fluxes flow in a connection part of the stator core 30 connected to the A phase winding part 31A. When the magnetic flux flows from the first auxiliary salient pole 31b of the B phase winding part 31B to the annular stator core 30 connected thereto, magnetic force increases due to the magnet 60 inserted into a path of the magnetic flux. Likewise, the magnet 60 is disposed on a path of the magnetic flux flowing from to the second auxiliary salient pole 31c of the A phase winding part 31A to the stator core 30 connected thereto, thereby making it possible to obtain increased magnetic force.

Likewise, when an A' phase winding part 31A', which is a first phase, formed on the opposite side to the A phase winding part 31A and including the coil 33 wound around the main salient pole 31a of the outer stator salient pole 31 has current applied thereto to be excited, a generated magnetic flux is bisected in the main salient pole 31a. Then, the bisected magnetic fluxes flow in auxiliary salient poles of the outer stator salient pole 31 adjacent thereto at both sides thereof, that is, a first auxiliary salient pole 31b of a B' phase winding part 31B' and a second auxiliary salient pole 31c of the A' phase winding part 31A', respectively, through the outer rotor salient pole 21. At this time, each of the magnets 60 is insertedly disposed on paths of the magnetic fluxes, thereby making it possible to obtain increased magnetic force.

At the same time, in order to rotate the inner rotor 10, when the inner stator salient pole 32 of the stator core 30 has current applied thereto to be excited, thereby generating a magnetic flux, the magnetic flux flows from a second salient pole 32b of an A phase winding part 32A, which is an inner stator salient pole 32 including the coil 33 wound therearound, to an inner rotor salient pole 11 facing the second salient pole 32b. Then, the magnetic flux sequentially passes through another inner rotor salient pole 11 adjacent to the inner rotor salient pole 11 and a first salient pole 32a facing another inner rotor salient pole 11 and including the coil wound therearound and then flows in the annular stator core 30 connecting the first and second salient poles 32a and 32b to each other, thereby making it possible to implement a shorter magnetic flux path as compared to the case according to the prior art. Even in this case, the magnetic flux flows in the stator core 30 connecting the first and second salient poles 32a and 32b to each other and the magnet 60 is disposed on the path of the magnetic flux, thereby making it possible to obtain relatively larger magnetic force when the same current is applied.

Likewise, a magnetic flux flows from a first salient pole 32a of an A' phase winding part 32A' of the inner stator salient pole 32 formed on the opposite side to the A phase winding part 32A and including the coil 33 wound therearound to an inner rotor salient pole 11 facing the first salient pole 32a. Then, the magnetic flux sequentially passes through another inner rotor salient pole 11 adjacent to the inner rotor salient pole 11 and a second salient pole 32b facing another inner rotor salient pole 11 and including the coil wound therearound and then flows through the magnet 60 disposed in the annular stator core 30 connecting the first and second salient poles 32a and 32b to each other, thereby making it possible to implement a shorter magnetic flux path as compared to the case according to the prior art and obtain relatively larger magnetic force when the same current is applied.

FIG. 9 shows a flow of a magnetic flux in the case in which a B phase winding part 31B, which is an inner stator salient pole 32 has current applied thereto to be excited, similar to the case in which a B phase winding part 31B, which is an adjacent outer stator salient pole 31, has current applied thereto to be excited, after FIG. 8. Since a technical principle thereof is the same as that of FIG. 8, a detailed description thereof will be omitted. When the current is applied through this principle, magnetic resistance is changed, such that the switched reluctance motor is driven.

The switched reluctance motor having the double rotor structure according to another preferred embodiment of the present invention may include six outer stator salient poles 31 protruded outwardly in a circumferential direction of the annular stator core and formed at equidistance and six inner stator salient poles 32 protruded inwardly in the circumferential direction of the annular stator core, as shown in FIGS. 2 to 9. Here, the coils 33 are wound around the main salient pole 31a of the outer stator salient pole 31 and the first and second salient poles 32a and 32b of the inner stator salient pole 32 to form a three-phase winding. In the case of the outer stator salient pole 31, the coils 33 may also be wound only around the first and second auxiliary salient poles 31b and 31c rather than the main salient pole 31a. Ten outer rotor salient pole 21 may be formed at equidistance so as to correspond to the outer stator salient poles 31, and ten inner rotor salient pole 11 may be formed at equidistance so as to correspond to the inner stator salient poles 32. Here, a unit of the outer stator salient pole 31 is based on a case in which the main salient pole 31a, the first auxiliary salient pole 31b and the second auxiliary salient pole 31c are sequentially formed in the counterclockwise direction in the cross-sectional view of FIG. 2. In addition, the number of inner stator salient poles 32 is based on a single inner stator salient pole 32 configured of the first and second salient poles 32a and 32b.

According to the preferred embodiments of the present invention, structures of salient poles of an annular stator core corresponding to each of salient poles formed on an inner rotor and an outer rotor of a switched reluctance motor having a double rotor structure including the inner rotor and the outer rotor are changed to reduce a magnetic flux path, such that the loss of magnetic force is prevented, thereby making it possible to efficiently drive the motor.

In addition, a magnetic flux path is reduced through a pi ($\pi$) shaped inner stator salient pole structure of the stator core corresponding to the salient poles formed on the inner rotor, thereby making it possible to reduce the loss of magnetic force.

Further, a magnetic flux path is reduced through an E shaped outer stator salient pole structure of the stator core corresponding to the salient poles formed on the outer rotor, thereby making it possible to reduce the loss of magnetic force.

In addition, an outer stator salient pole is formed in a structure in which it includes a main salient pole and auxiliary salient poles, and the main salient pole has a width wider than those of the auxiliary salient poles in a circumferential direction. Therefore, a magnetic flux is bisected in the main salient pole to form a short magnetic flux path through each of the auxiliary salient poles adjacent to the main salient pole, such that the loss of magnetic force is prevented, thereby making it possible to efficiently drive the motor.

Further, support materials, which are non-magnetic materials, are formed between the inner rotor salient poles formed on the inner rotor, thereby making it possible to improve strength of the motor structure and reduce noise and vibration at the time of driving of the motor.

In addition, sound proofing materials are formed between the salient poles of the outer rotor, thereby making it possible to prevent noise at the time of driving of the motor.

Further, coils are wound around each of the main salient pole or the auxiliary salient poles of the outer stator core, thereby making it possible to change a structure of turns of the coil as desired.

Furthermore, each of magnets is formed on the stator core and is disposed at a point through which a magnetic flux path of the outer stator core passes and at a point through which a magnetic flux path of the inner stator core passes, such that all of the magnets form torque components at the time of driving of the switched reluctance motor having the double rotor structure, thereby making it possible to efficiently utilize the magnets.

Although the preferred embodiments of the present invention have been disclosed for illustrative purposes, they are for specifically explaining the present invention and thus a switched reluctance motor according to the present invention is not limited thereto, but those skilled in the art will appreciate that various modifications, additions and substitutions are possible, without departing from the scope and spirit of the invention as disclosed in the accompanying claims.

Accordingly, such modifications, additions and substitutions should also be understood to fall within the scope of the present invention.

What is claimed is:

1. A switched reluctance motor comprising:
an outer rotor including a plurality of outer rotor salient poles formed at equidistance along a circular inner circumferential surface thereof;
an inner rotor received in an inner portion of the outer rotor and including a plurality of inner rotor salient poles formed at equidistance along a circular outer circumferential surface thereof; and
a stator core formed between the outer rotor and the inner rotor and including a plurality of outer stator salient poles each including a main salient pole, a first auxiliary salient pole, and a second auxiliary salient pole that correspond to the outer rotor salient poles and are sequentially formed along an outer circumferential surface thereof and a plurality of inner stator salient poles each including a first salient pole and a second salient pole that correspond to the inner rotor salient poles and are sequentially formed along an inner circumferential surface thereof,
wherein each of coils is wound around the main salient pole and the first and second salient poles.

2. The switched reluctance motor as set forth in claim 1, wherein the first and second auxiliary salient poles of the outer stator salient pole and the first and second salient poles of the inner stator salient pole are disposed to correspond to each other in a direction such that the first and second auxiliary salient poles face the first and second salient poles, respectively.

3. The switched reluctance motor as set forth in claim 1, further comprising support materials formed between the first and second salient poles configuring the inner stator salient pole and between the plurality of inner stator salient poles.

4. The switched reluctance motor as set forth in claim 3, wherein the support material is a non-magnetic material or an insulation material.

5. The switched reluctance motor as set forth in claim 3, further comprising cooling pipes inserted into the support material and disposed between the plurality of inner stator salient poles.

6. The switched reluctance motor as set forth in claim 1, further comprising sound proofing materials formed between the plurality of outer rotor salient poles formed at equidistance.

7. The switched reluctance motor as set forth in claim 1, wherein the main salient pole configuring the outer stator salient pole has a width wider than those of the first and second auxiliary salient poles in a circumferential direction.

8. The switched reluctance motor as set forth in claim 2, further comprising magnets inserted into an annular stator core connecting the first and second salient poles configuring the inner stator salient pole to each other.

9. A switched reluctance motor comprising:
an outer rotor including a plurality of outer rotor salient poles formed at equidistance along a circular inner circumferential surface thereof;
an inner rotor received in an inner portion of the outer rotor and including a plurality of inner rotor salient poles formed at equidistance along a circular outer circumferential surface thereof; and
a stator core formed between the outer rotor and the inner rotor and including a plurality of outer stator salient poles each including a main salient pole, a first auxiliary salient pole, and a second auxiliary salient pole that correspond to the outer rotor salient poles and are sequentially formed along an outer circumferential surface thereof and a plurality of inner stator salient poles each including a first salient pole and a second salient pole that correspond to the inner rotor salient poles and are sequentially formed along an inner circumferential surface thereof,
wherein each of coils is wound around the first and second auxiliary salient poles and the first and second salient poles.

10. The switched reluctance motor as set forth in claim 9, wherein the first and second auxiliary salient poles of the outer stator salient pole and the first and second salient poles of the inner stator salient pole are disposed to correspond to each other in a direction such that the first and second auxiliary salient poles face the first and second salient poles, respectively.

11. The switched reluctance motor as set forth in claim 9, further comprising support materials formed between the first and second salient poles configuring the inner stator salient pole and between the plurality of inner stator salient poles.

12. The switched reluctance motor as set forth in claim 11, wherein the support material is a non-magnetic material or an insulation material.

13. The switched reluctance motor as set forth in claim 11, further comprising cooling pipes inserted into the support material and disposed between the plurality of inner stator salient poles.

14. The switched reluctance motor as set forth in claim 9, further comprising sound proofing materials formed between the plurality of outer rotor salient poles formed at equidistance.

15. The switched reluctance motor as set forth in claim 9, wherein the main salient pole configuring the outer stator salient pole has a width wider than those of the first and second auxiliary salient poles in a circumferential direction.

16. The switched reluctance motor as set forth in claim 10, further comprising magnets inserted into an annular stator core connecting the first and second salient poles configuring the inner stator salient pole to each other.

* * * * *